Figure 1:
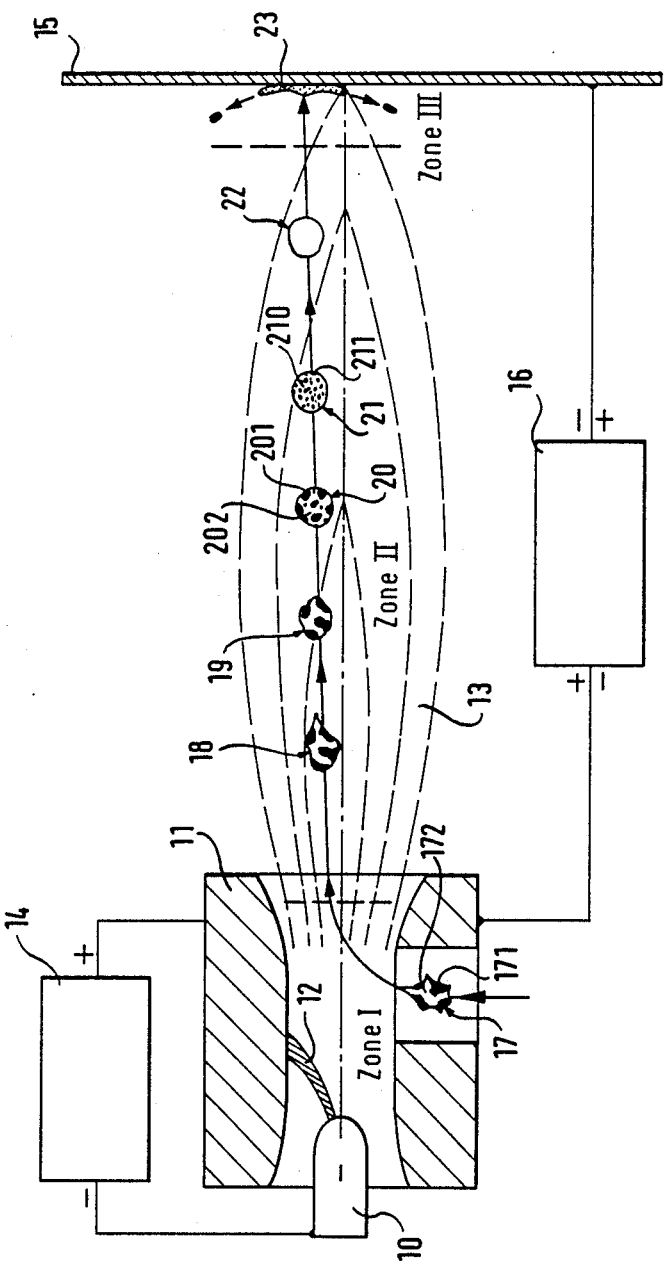

United States Patent [19]

Hodes et al.

[11] Patent Number: 4,900,639
[45] Date of Patent: Feb. 13, 1990

[54] CLADDING OF BEARING METAL AND PROCESS FOR PRODUCTION THEREOF

[75] Inventors: Erich Hodes, v.d. Höhe; Ulrich Engel, Bad Schwalbach; Heiko Gruner, Beinwil am See, all of Fed. Rep. of Germany

[73] Assignees: 501 Glyco-Metall-Werke Daelen, Wiesbaden, Fed. Rep. of Germany; Loos GmbH, Zug, Switzerland

[21] Appl. No.: 163,092
[22] PCT Filed: Jun. 25, 1987
[86] PCT No.: PCT/EP87/00334
§ 371 Date: Apr. 22, 1988
§ 102(e) Date: Apr. 22, 1988
[87] PCT Pub. No.: WO88/00251
PCT Pub. Date: Jan. 14, 1988

[30] Foreign Application Priority Data

Jun. 25, 1986 [DE] Fed. Rep. of Germany ....... 3621184

[51] Int. Cl.$^4$ ................................................ B32B 9/00
[52] U.S. Cl. .................................... 428/610; 428/653; 428/674
[58] Field of Search ............... 428/624, 610, 614, 653, 428/654; 223/555, 558; 427/34, 295, 423

[56] References Cited

U.S. PATENT DOCUMENTS

| | | | |
|---|---|---|---|
| 2,233,304 | 2/1941 | Bleakley | 239/85 |
| 3,332,752 | 7/1967 | Batchelor et al. | 428/558 |
| 3,941,903 | 3/1976 | Tucker, Jr. | 427/423 |
| 3,950,141 | 4/1976 | Roemer | 428/654 |
| 4,188,079 | 2/1980 | Mori | 428/654 |
| 4,189,525 | 2/1980 | Mori | 428/654 |
| 4,596,718 | 6/1986 | Gruner | 427/295 |

FOREIGN PATENT DOCUMENTS 1083003  9/1967  United Kingdom .
2130250A 5/1984  United Kingdom ................ 428/610

Primary Examiner—L. Dewayne Rutledge
Assistant Examiner—David Schumaker
Attorney, Agent, or Firm—Webb, Burden, Ziesenheim & Webb

[57] ABSTRACT

Leakproof, adhesive, non-lamellar and pore-free antifriction coatings can be produced from essentially oxidation-sensitive dispersion alloys, with at least two metallic alloy components forming a miscibility gap in the solid state, by means of vacuum plasma-spraying with a practically homogeneous material distribution. Precipitation crystallites of alloy components are significantly below 5 μm and fringe-crystal growth is definitely inhibited. By adding hard particles during the coating process further dispersion consolidation can be achieved. Such antifriction coatings improve longevity, corrosion resistance and emergency lubrication of sliding surfaces without reducing their running-in characteristics and their ability to bed in foreign matter. They can be deposited individually on to sliding bearing components or continuously on to supporting strips.

21 Claims, 2 Drawing Sheets

CLADDING OF BEARING METAL AND PROCESS FOR PRODUCTION THEREOF

The invention relates to a cladding of bearing metal applied to a supporting member, directly or over an intermediate layer, and comprising a dispersion alloy of at least two metallic constituents in a mixture leading to miscibility gaps, such as aluminum-lead, aluminum-tin, copper-lead dispersion alloys and the like, and to a process for production thereof. Claddings of bearing metal are employed as functional surface layers in many different fields of application.

The most familiar cladding methods today for producing semifabricated stock, journal bearings or bearing elements clad with bearing metal consisting of dispersion alloys are casting methods (e.g. centrifugal or stationary casting) and coating methods (flame or arc or plasma discharge, cathode disintegration and vapor deposition). Various processes owe their original development to the fact that journal bearings or bearing elements with working surfaces of dispersion alloys must be produced in widely varying shapes and sizes. Bushings over 1200 mm in inside diameter or friction members in the form of balls or sockets cannot be clad by centrifugal casting methods.

Stationary casting is preferred for this purpose. The necessary thickness of the layer of bearing metal likewise substantially influences the choice of a cladding process. Thin films of bearing metal, only about 20 microns in thickness, may be applied for example by cathode disintegration directly to a bearing surface suitably prepared for the purpose. For thicker layers, this process is too cost-intensive.

The main reason for the use of different methods of application lies in the specific layer texture of dispersion alloys. In the solid state, they are not alloyed but form a mechanical mixture of pure substances in various crystallite sizes. The intimate structure of the layers of bearing metal is altogether decisive for the endurance, corrosion resistance and critical lubricating condition of the bearing. This applies especially to the layer structure in the miscibility gap of e.g. monotectic alloys. In practice, many alloys that may be used in journal bearing technology are affected with the disadvantage of miscibility gaps. Hence it becomes necessary to circumvent the physical constraint by special methods of manufacture, to arrange compromises. By interposing (e.g. dispersion hardening) additional alloy components, it is possible to compensate the disadvantage of lower stability of layer due to lacking Pb content in an AlPb bearing metal layer and thereby enhance the endurance of the bearing layer.

To illustrate the problematics of producing layers of bearing metal, the stationary casting method for lead-bronze bearings will be taken as an example. The support member prepared for casting must be mounted, screwed down and sealed up on a foundry platform. With temperature control, the support member is preheated to the casting temperature, about 1700° C. Immediately after pouring in the CuPb bearing metal, controlled withdrawal of heat is effected by cooling with water to avoid a directed solidification of the melt and shrink the metal onto the support member. By pumping, froth and inclusions of air can be moved to the surface. As the metal level sinks by shrinkage, the pour is topped off. The cooling process is especially critical for monotectic alloys, since the textural configuration of the layer determines endurance. Long cooling times are unavoidable because of the thickness of the cast layer. They interfere with bonding to the support member and prevent a homogeneous structure. Forced formation of copper crystals involves the hazard of vertical transcrystallization from the bottom up to the surface of the layer. Such "stalk" crystals tend to conduct superficial fatigue cracks up to the surface of the substrate and thus severely curtail the life of the bearing. Coarser, lineal segregations of Pb, jeopardizing the internal structural stability of the bearing, can be avoided practically only by abrupt quenching, which especially in the case of very large support members is not feasible.

Not to dwell upon the equally important disadvantages of centrifugal casting (and only mentioning the problem of gravity separation in support members of larger size), it is understandable enough that attempts have been made from a very early period to overcome the problems of foundry techniques by powder metallurgy or laminating.

Early advances were achieved with bearing metal cladding applied by rolling. German Letters of Disclosure No. 1,775,322 describe a three-layer bearing in which, by powder rolling with subsequent sinter consolidations, an AlPb bearing material with Si, Sn and Cu components was successfully produced with a fairly fine dispersion of the components. Sliding properties and endurance of bearings thus produced have been definitely improved, although the process of manufacture remains cost-intensive. The markedly lamellar structure of such a layer of bearing metal, due to the rolling operation, limits its load capacity.

Utilizing the advantages of comparatively homogeneous distribution of components in particles of powdered dispersion alloys, bearing metal layers have been produced with the aid of thermal discharges. GLD No. 2,656,203 discloses a journal bearing member consisting of a metallic dispersion alloy applied by flame, arc or plasma discharge, with subsequent mechanical consolidation. A similar coating is described in British Pat. No. 1,083,003, where, using detached spray apparatus, metals of widely differing weights are mixed into the layer of bearing metal. A further development is represented by GLD No. 3,242,543, where, in the layer of bearing metal as a functional layer of metallic dispersion alloy, the proportions of the alloy components vary over the thickness of the layer.

Despite good industrial prospects, none of the bearing metal layers so far produced by thermal discharge in air have come into large-scale use. This is because of a series of unavoidable disadvantages.

All known bearing metal alloys such as AlPb, AlSn or CuPb are highly reactive and easily oxidized. The sprayed layers consequently present a pronouncedly laminar structure. Sprayed powder particles react at the surface with the oxygen of the air, so that after impinging on the surface of the support member, the several flake-like portions of layer are separated from each other by thin films of oxide. In dynamic stress, premature failure occurs at these boundary surfaces.

At the same time, owing to the partial surface oxidation of the bearing metal alloy, the hardness of the layer is irregularly increased, so that the necessary adaptation of the sliding friction pair during the running-in period is lost. Such bearings have a strong tendency to seize. Their ability to imbed foreign particles is likewise lost, and sliding surfaces become badly scored.

As an additional critical disadvantage, all bearing metal layers hitherto applied by thermal discharge have a fabricational layer porosity of up to 10%, depending on spray process and choice of powders. Endurance already weakened by lamellar structure is further impaired by the internal notch effect of porosity.

Another serious drawback is the limited adhesion of all bearing metal layers applied by spraying to date. Despite roughening of the surface of the support member, layers of bearing metal do not adhere sufficiently, owing to their partial oxidation. The substrate temperature cannot be raised while laminating in order to improve the bond, since the materials of the support member themselves are endangered by oxidation.

The object of the invention, then, is to provide a cladding of bearing metal of the kind initially described, that is substantially improved in its structure and functional properties, such as sliding and friction characteristics, temperature stability and imbeddability of foreign particles, as well as in properties of bonding to the substrate.

This object is accomplished, according to the invention, in that the alloy constituents in the range of the miscibility gaps form a homogeneous layer, practically free from pores, lamellae and "stalk" crystals, its fine particles substantially not exceeding about 5 microns in size.

The result is a layer of bearing metal in which:
All alloy constituents are distributed with utmost homogeneity,
The matrix of the layer is free from pores and nearly of the density of the solid state,
No lamellar structure or "stalk" crystals are present,
The internal structural stability and the bonding to the surface of the support member are sufficiently strong.

A method of producing such a layer of bearing metal according to the invention is characterized in that the layer of bearing metal is produced by plasma discharge, the alloy constituents being introduced into the plasma jet in powdered form, the powdered particles being fused and alloyed in the plasma jet, and the alloyed particles being quenched on the surface of the support member, said layer of bearing metal being advantageously produced by vacuum plasma spraying (VPS).

This process permits the layer of bearing metal to be produced in any desired thickness. Only thus can the wide variety of support member surfaces and slide bearing shapes be coated in a single operation of deposition with a layer of bearing metal optimally adjusted in its structure and sliding properties to the specific duty of the bearing.

The functional layer of oxidation-sensitive bearing metal is deposited pore-free and tightly adhering on a support member of any desired shape by the process of vacuum plasma spraying (VPS), using the per se known advantages of the coating technology described for example in GLD No. 3,422,718. As a decisive improvement, the bearing metal cladding produced according to the invention is distinguished by a highly homogeneous distribution of alloy constituents, heretofore achieved for alloys with miscibility gap by powder metallurgy only. The layer constituents not alloyable in the solid state form crystallites well below 5 microns in size. At the same time, for their fine distribution in the bearing metal layer according to the invention, a fixed mixture ratio may be selected, and maintained with high reliability in production.

The bearing metal layer may conveniently be of such structure that the mixture ratio of fine particles of alloy constituents varies across the thickness of the layer.

Advantageously, the layer of bearing metal may contain hard particles initially added to one or another of the constituents or additionally supplied in building up the bearing metal layer, in the form of extremely fine, dispersion-consolidating particles in fixed proportion and statistical distribution.

The proportion of hard particles added may advantageously be between about 1 and about 5 vol. % referred to the volume of the layer of bearing metal. At the same time, the proportion of additional hard particles may be variable across the thickness of the bearing metal layer.

The layer of bearing metal, in particular on members in sliding friction, is further characterized in that the support member consists of steel and the bearing metal cladding, as a sliding or friction layer, contains an aluminum-lead or aluminum-tin dispersion alloy and hard particles in the form of extremely fine particles of aluminum oxide.

Further, the bearing metal layer may advantageously be configured as a sliding coating of lead-tin bronze, for example with 10 wt. % lead, 10 wt. % tin, rest copper.

The bearing metal layer may conveniently be coated additionally with a running-in layer of lead-tin alloy or lead-tin-antimony alloy.

Owing to the process of cladding according to the invention, the bearing metal layer is entirely free from lamellae, even though, like any other thermal discharge layer, it is built up continuously out of sheet-like portions. Stalk crystallization is reliably excluded. Segregated crystals are necessarily formed in uniform distribution within the layer and continuously during its formation. The same applies to the imbedded particles of hard material intended to provide a definite hardness of the layer. Within the scope of the invention, they may be incorporated in the layer of bearing metal in accurately proportioned and reproducible quantity, optionally with mixture ratio constant or variable over the thickness of the layer. By this dispersion hardening of the bearing metal layer, endurance is enhanced in a controlled manner without loss of adaptability in the running-in phase or of imbeddability of foreign particles.

Especially advantageous and convenient refinements and embodiments of the method according to the invention for producing a bearing metal cladding are specified in claims 11 to 22.

Specifically, the bearing metal layer is advantageously deposited directly on the support member in a spray layer density practically matching that of the solid substance. Its residual porosity is well under 1%, so that no subsequent consolidating operation is required, such as has been necessary for thermal bearing metal layers.

Conveniently, the surface of the support member of the bearing metal cladding according to the invention is degreased, lightly sand blasted, sputter cleaned with a transferred arc, and degassed by preheating. Especially for thick layers of bearing metal on steel supports, it may be highly advantageous if a vacuum degassing of the substrate surface has been performed just before spray application.

In certain cases, an underlayer may be sprayed on before the bearing metal layer is applied. This becomes advisable when, because of mechanical considerations of journal bearing design, a certain substrate material must be selected as support for the bearing metal cladding, on which the adhesive bond is inadequate despite sputter cleaning.

In a preferred version, the layer of bearing metal is deposited at a specifically adjusted surface temperature of the support member, so that in the substrate-layer boundary region, an interdiffusion of limited extent will occur. At the same time, the internal structural stability of the bearing metal layer may be additionally enhanced by more effective fusion of the layer portions. To relieve internal stresses, the temperature of deposition should be kept constant in the layer as it is formed.

Advantageously, the bearing metal layer according to the invention is deposited with constant application of a transferred arc at a high speed of deposition. The surface of the support member will be connected as anode and electrically insulated from the coating system.

The current of the transferred arc here acts as an additional source of energy in the plasma flame, so that with otherwise equal plasma flame temperatures, substantially more powdered bearing metal can be melted on. Up to 200 g/min. spray powder will deposit at 56 KW burner output for example, if 20 to 40 A of transmitted arc current is applied. Especially for the continuous cladding of support strips, high speeds of deposition are desired, since the entire spray layer should advantageously be applied in a single pass.

Conveniently, the alloy constituents of the bearing metal layer are brought together in the spray powder used, for example in agglomerated form and/or as pre-alloyed material. The grain shape and distribution of the spray powder will be determined by the purposes of the bearing metal layer and optimized in the process for its production.

The spray powder is advantageously conveyed to the plasma burner by way of a plurality of powder lines and injected into the flame in several locations. Then different kinds of powder can be injected simultaneously or consecutively in time. The structure of dispersion-hardened bearing metal layers, multi-layer sandwich structures and mixtures with mixture ratio constant or variable over the thickness of the layer call for this alternative. For bearing metal layers of AlPb, AlSn or AlCd alloys, the selected layer structure may for example be such that pure Al is present in the neighborhood of the surface of the supporting member. An intermediate part of the bearing metal layer contains the bearing metal alloy in which non-metallic hard substances are incorporated in the form of extremely fine particles, their concentration varying as a function of the thickness of layer. The cover layer is sprayed on without particles of hard substance.

In preferred embodiment, the deposition takes place at 50 to 150 mbar ambient pressure with the minimum possible partial pressure of reactive gases, to keep the chemical composition of the spray powder and of the resulting layer of bearing metal identical. In special cases, however, a controlled doping of the room atmosphere or the plasma flame with a reagent gas is conceivable, to alter the spray layer chemically in a determinate manner relative to the original substances. For example, by means of the $O_2$ partial pressure in the spray chamber, the hardness of a bearing metal layer consisting for example of AlPb may be enhanced. But then the hardness of a plasma stratum sprayed on in contact with the atmosphere (APS) will not be equalled by far. Practically no lamellar structure is visible.

In production of the bearing metal layer on support members such as bearing shells or ball sockets for example, preferably the deposition is carried out in batch operation. With the aid of internal substrate handling systems, several parts may then be clad in succession without need to open the chamber.

For small support members, the substrate lines and handling systems are advantageously so arranged that several parts may be simultaneously clad with a bearing metal layer according to the invention.

The method according to the invention is suitable for continuous deposition of the bearing metal layer on a strip of metal.

Preferably in that case, the strip of support material is passed through the coding system with the aid of reels by way of preceding and following air locks. Of course additional required operations may be carried out during strip transport.

Figure 2:
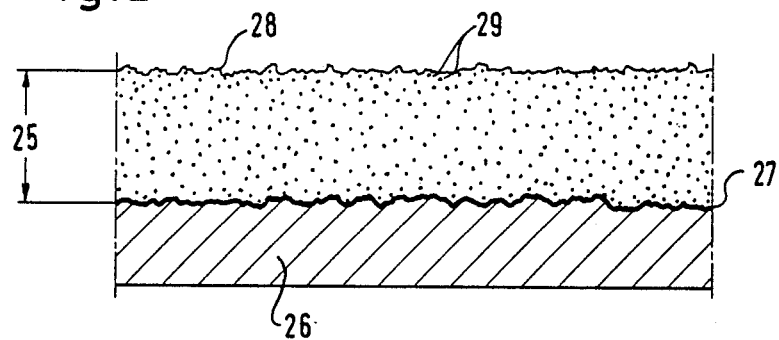
Figure 3:
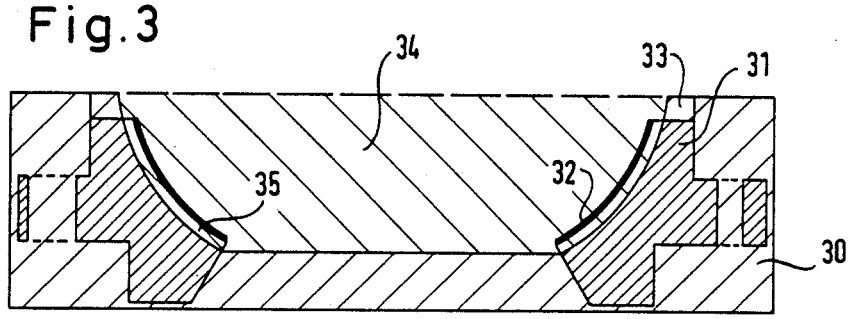
Figure 4:
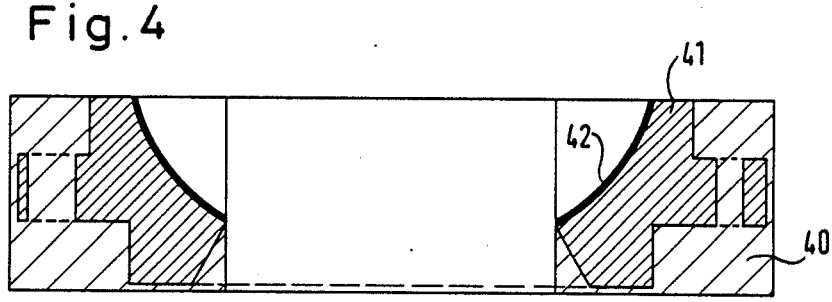
Figure 5:
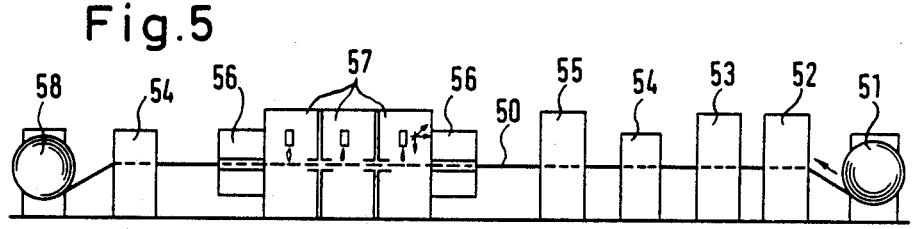

In the following, the invention will be illustrated in more detail in terms of embodiments by way of example and with reference to the drawings. In the drawings, FIG. 1 shows a diagram of a VPS system with the process steps critical to the cladding according to the invention, FIG. 2 shows a bearing metal layer built up by VPS technology in accordance with the invention, FIG. 3 shows a support member as substrate in schematic form and dimensions for bearing metal layers to be applied by stationary casting according to the prior art, FIG. 4 shows the same support member as in FIG. 3 in a shape and dimensions for bearing metal layers to be applied according to the invention, and FIG. 5 shows a diagram of a VPS system for continuous coating of support member strips with a layer of bearing metal.

For the cladding of the surface of a supporting element or member with a layer of bearing metal as functional layer, as schematically represented in FIG. 1, an arc 12 is operated between a water-cooled cathode 10 and anode 11, converting the gas supplied to the burner into a plasma flame 13. Between cathode 10 and anode 11, a plasma current supply 14 is connected, and between anode 11 and support element or part 15 to be coated, a current supply 16 for a transferred arc. In the plasma flame 13, by way of openings in the anode 11, spray powder particles 17, 18, 19, 20, 21, 22 are injected, accelerated, heated, melted, and projected as droplets upon the surface of the part or support element 15. The shape and internal structure of the spray powder particles are thereby radically altered, producing the bearing metal layer according to the invention.

The atmospheric pressure may be 1000 mbar, the inert gas pressure 900 mbar and the vacuum pressure 50 mbar.

The continuous coating process is indicated by representing individual spray powder particles in particular segments of the process.

Spray powder particle 17 schematically indicates the shape and structure of alloys with miscibility gap in the solid state. The several alloy constituents are not homogeneously distributed but crystallized out in regions of pure concentrations of material 171, 172 for example in the case of a binary lead bronze. To give an idea of crystallite size, possible orders of magnitude are suggested. Spray powder particle 17 is 10 to 100 microns in diameter, preferably 60 microns. The several copper and lead intervals range between 1 and 25 microns, and so are far too coarse for the production of a homogeneous layer structure corresponding to the bearing metal layer according to the invention.

Immediately after penetration into the plasma flame 13 (zone I), the spray powder particle is accelerated and very rapidly heated. Spray powder particle 18 has not yet reached the melting point, and so is unchanged in shape and internal structure relative to particle 17. Just a little later, fusion begins, as indicated by rounding of the surface configuration of particle 19.

Spray powder particle 20 is already completely molten; the regions 201, 202 of concentration of pure material begin to amalgamate with further rising temperature in particle 21, reducing their size to regions 210, 211, finally giving way to a practically homogeneous melt in particle 22 (zone II).

Now a decisive point is that the alloy of materials with miscibility gap homogeneously present in this superheated form (zone III) impinges on the surface of the substrate or support member 15 with high kinetic energy, is deformed into a flat pancake 23, and thus cools so quickly that the homogeneous distribution of material is virtually frozen in. Necessarily, the bearing metal layer according to the invention results, with crystallites of pure materials definitely under 5 microns in size.

No matter whether the material worked with is prealloyed spray powder or spray powder particles of pure agglomerated substances, such a functional layer, or bearing metal layer with homogeneous distribution over the entire thickness of layer, is formed as represented in FIG. 2. A bearing metal layer 25 is deposited on a support member 26 slightly roughened by sandblasting, which immediately before coating was sputter cleaned with the aid of a transferred arc (current supply 16) and heated to a determinate surface temperature. the bearing metal layer 25, in the example shown an AlPb layer (80:20 wt. %), bonds very well to the surface of the support member 26. With the aid of an interdiffusion layer, or interlayer, about 1 micron and not more than 5 microns thick, as an adhesion layer 27, the adhesion can be reinforced still further. This may become necessary in any case where a continuously clad strip of support material is to be formed individually by stamping and by rolling or pressing together with the bearing metal layer 25 into the final bearing geometry. For certain support materials, it may also be necessary to spray on a special adhesion layer 27, not shown in the example chosen. The bearing metal layer 25 itself is free from lamellae, although the layer is built up out of individual flakes 23. Owing to the special clean conditions of VPS technology, the superheated liquid droplets have no co-reagent with which to become superficially oxidized. Hence the several pancakes of the layer are not separated by oxide films. Substrate temperature and recrystallization of spray powder particles are so matched to each other that the pancake 23 amalgamate, and a very good internal structural stability is achieved in the bearing metal layer 25.

The bearing metal layers thus produced are practically free from pores. The kinetic energy of impact of successive droplets is so high that any solidification pores and any shrinkage of material upon rapid cooling are completely filled out and compensated.

An especially favorable feature is found to be the high operating speed of the process of VPS cladding, so as to diminish evaporation losses during the melting phase. Especially AlPb bearing metal layers with high Pb content benefit by this.

Pb segregations 29 visible in the bearing metal layer 25 with surface 28 are very homogeneously distributed, and definitely below 5 microns in particle diameter. This applies also when multi-substance alloys are employed and additional components are mixed with the binary bearing metals on a base of AlPb, AlSn or CuPb:

(a) Additive to improve sliding properties (Pb, Sn, Sb, Bi)
(b) Additives for alloy consolidation (Ni, Cu, Ti, B)
(c) Additives for hardening the Al matrix (Si, Cu, C)
(d) Additives to increase Pb content while retaining homogeneous fine division (Ni, Se, Zr, Te, Ce)
(e) Additives for dispersion hardening of the beating metal layer, to increase wear resistance and enhance the thermal load capacity of the bearing metal layer ($Al_2O_3$, $TiO_2$, $Cr_2O_3$ and their mixtures, stabilized $ZrO_2$ as well as $B_4C$, SiC, AlN and $Si_3N_4$)

Segregated crystallites and/or particles of the layer additives are generally smaller, owing to lower concentration, than the Pb regions or segregations 29.

Preferred bearing metal layers used are:
1. AlPbSiSnCu - Alloys with a Pb content between 8 and 16%. The proportion of Si is about 4%, Cu and Sn vary between 0.8 and 2%.
2. AlSn - Alloys, with Sn content up to 40%.
3. CuPb - Alloys with Pb content enhanced to as much as 50% by Se, Te or Zr additives.

The following table lists the essential properties of bearing metal layers that may be produced according to the invention, in comparison with the prior art. The endurance strength is defined as the bearing load, in $N/mm^2$, at which $60.10^6$ load reversals are survived without cracks or eruptions in the bearing metal layer.

| Property | Prior Art | Bearing Metal Layer according to the Invention |
|---|---|---|
| Layer structure | lamellar, with fairly coarse segregations, tendency to "stalk" crystals | practically homogeneous elementary distribution no dendrites |
| Crystallite size | 20 microns and a good deal larger | under 5 microns |
| Porosity | 2–10% | 0–1% |
| Mean rugosity | 10–30 microns | 5–10 microns |
| Adhesion | 30–50 N/mm$^2$ | 50–80 N/mm$^2$ |
| Hardness HV | 80–30 N/mm$^2$ | 40–80 N/mm$^2$ |
| Endurance strength | 50–70 N/mm$^2$ | 70–90 N/mm$^2$ |

In view of the high spray layer density and improved surface quality of the bearing metal layer according to the invention, no subsequent consolidating operations are required. The mechanical finishing to produce a sliding surface, however, is much simplified.

As aforementioned, the method of producing bearing metal layers according to the invention may also be used to deposit systems of layers, multiple structures and graduated spray layers, using the specific advantages of VPS technology.

Besides the qualitative improvements in the bearing metal layer as a functional cladding, a number of additional advantages are gained by the application of the invention.

FIG. 3 schematically shows a cylinder drum machined out of a blank shape 30. The cylinder drum requires a spherical socket 31, to be produced by stationary casting. The support blank is only roughed out.

So that the entire spherical bearing surface may be uniformly clad with a layer of bearing metal 32, a rim 33 must be raised for the casting. The entire spherical mold must be filled with casting material 34, with nearly the whole of the cast material 34 to be afterwards removed by machining. Additional casting material 35 is required because the structure of the bearing metal layer 32 will develop the requisite sliding properties only at a certain distance from the bottom. Necessarily, the layer of bearing metal will be very thick. Some of the structure of the support member will consequently be executed in bearing metal, when the cylinder drum has been machined out of the blank 30. Tolerances in mechanical finishing have to be compensated in the bearing metal.

If instead the layer of bearing metal is sprayed on as a functional layer according to the invention, then, as schematically indicated in FIG. 4, the whole support member can be finish-machined complete. The blank 40 itself is considerably simpler and more economical of material. Instead of solid stock, tubular material may be used. With high precision, the spherical socket 41 is prepared so that the sprayed-on bearing metal layer 4 will only require superficial polishing. The savings in material and machining time far exceed the cost of cladding. Often, under these favorable conditions, cheaper support materials can be used, since the sprayed-on bearing metal layer 42 surpasses a stationary-cast layer 32 in properties.

For the production of the said bearing metal layers, VPS systems according to the prior art may be employed, securing certain quality requirements. As previously mentioned, for the cladding of supporting members, batch systems with internal substrate handling systems are preferred, such as the prior art affords today. For large quantities of supporting members of identical shape, a trap system may be more economical.

FIG. 5 schematically shows a cladding system preferably employed for continuous coating of support material in the form of an endless strip. Additional operations may be performed on the strip 50 as well. From a reel 51, the strip 50 is lightly roughened in a sand-blasting unit 52, then cleaned and degreased in an ultrasonic unit 53. Shears 54 and a welding unit 55 provide an endless strip to be conveyed through air lock chambers 56 through a cladding chamber 57 and wound up on a second reel 58. In the cladding chamber 57, strip segments of given length are sputter cleaned, heated and clad successively using a burner in stop-go operation.

With the aid of computer-controlled handling systems, the requisite maneuvers can be carried out reproducibly. Alternatively, however, a simultaneous performance of all steps with continuous strip transport is possible, for which purpose several burners will be in operation simultaneously. They will in that case be moved synchronously over the strip 58. A first burner system will for example sputter the substrate surface, while a second system sprays on the dispersion alloy and a third system adds a softer covering layer to improve the running-in behavior of the functional working layer.

We claim:

1. Bearing metal layer applied by vacuum plasma spraying to a support member directly or over an interlayer, comprising a dispersion alloy having at least two metallic components in a mixture leading to miscibility gaps, selected from the group consisting of aluminum-lead, aluminum-tin, and copper-lead dispersion alloys, said components, in the region of the miscibility gaps, forming a homogeneous alloy layer substantially free from pores, lamellae and stalk crystals, having uniformly dispersed fine particles comprising precipitation crystallites of one of said metallic components of a size substantially less than 5 microns and having a porosity of about 0% to 1%.

2. Bearing metal layer according to claim 1 wherein a mixture ratio of the fine particles of the alloy components is varied over the thickness of the bearing metal layer.

3. Bearing metal layer according to claim 1 or 2 comprising hard particles initially added to one of the components or additionally introduced in building up the bearing metal layer as extremely fine dispersion-consolidating particles in a determinate added proportion and statistical distribution.

4. Bearing metal layer according to claim 3 wherein the added proportion of hard particles is between about 1 and about 5 vol. % of the bearing metal layer.

5. Bearing metal layer according to claim 3 wherein the added proportion of hard particles is varied over the thickness of the bearing metal layer.

6. Bearing metal layer according to claim 1 wherein the support member consists of steel, and the bearing metal layer, as a sliding layer or layer in friction, contains an aluminum-lead or aluminum-tin dispersion alloy and hard particles in the form of extremely fine particles of aluminum oxide.

7. Bearing metal layer according to claim 1 comprising a sliding layer of lead-tin bronze, consisting of about 10 wt. % lead, 10 wt. % tin, balance copper.

8. Bearing metal layer according to claim 1 including a running-in layer of lead-tin alloy or lead-tin-antimony alloy.

9. Method of producing a bearing metal layer on a support member, comprising spraying by vacuum plasma discharge a dispersion alloy having at least two metallic components in a mixture leading to miscibility gaps, selected from the group consisting of aluminum-lead, aluminum-tin, and copper-lead dispersion alloys, introducing the alloy component into the plasma jet in powdered form, fusing the particles of powder and forming a homogeneous melt of said dispersion alloy in the plasma jet, and quenching the fused alloyed particles on the surface of the support member to form a homogeneous alloy layer substantially free of pores, lamellae and stalk crystals, having uniformly disposed fine particles comprising precipitation crystallites of one of said metallic components of a size substantially less than 5 microns and having a porosity of about 0% to 1%.

10. Method according to claim 9 wherein, prior to spraying, the surface of the support member to be coated is roughened and/or sputter-cleaned by a transferred arc and the support member is preheated to a predetermined temperature.

11. Method according to claim 9 or 10 wherein the bearing metal layer is built up while maintaining an arc transferred to the support member.

12. Method according to claim 9 wherein the metallic components of the bearing metal layer are agglomerated as fine particles into particles of powder and this agglomerate is introduced into the plasma jet, where it is fused and alloyed at least in substantial part.

13. Method according to claim 9 wherein the metallic components are introduced into the plasma jet as pre-alloyed spray powder, and fused and alloyed therein at least in substantial part 14. Method according to claim 9 wherein a reagent gas acting chemically on at least one component of the dispersion alloy is added while the bearing metal layer is being built up for at least partial conversion of that alloy component into a desired chemical compound.

15. Method according to claim 9 wherein while the bearing metal layer is being built up, besides its alloy components, additional hard particles of oxidic or non-oxidic kind are supplied to the plasma jet.

16. Method according to claim 9 wherein to clad a strip-like support or a plurality of support members arranged on a backing with a layer of bearing metal, the said strip-like support or the backing together with the support members is continuously passed through a number of serially arranged plasma spray stations without intervening contact with the outside atmosphere.

17. Method according to claim 9 wherein prior to application of the bearing metal layer, an interlayer is applied to the support member as an adhesion layer.

18. Method according to claim 17 wherein the metallic component of the bearing metal layer having a higher melting point is employed for the adhesion layer.

19. Method according to claim 18 wherein said support member is steel having a bearing metal layer of aluminum and one selected from the group consisting of lead, tin, and antimony, and wherein aluminum is used for the adhesion layer.

20. Method according to claim 9 wherein the bearing metal layer is applied with 80 wt. % aluminum and 20 wt. % lead as alloy components.

21. Method according of claim 9 wherein the bearing metal layer, after plasma spraying, is consolidated and its free surface smoothed by the exertion of pressure by rolling.

* * * * *

UNITED STATES PATENT AND TRADEMARK OFFICE
CERTIFICATE OF CORRECTION

PATENT NO. : 4,900,639

DATED : February 13, 1990

INVENTOR(S) : Erich Hodes, Ulrich Engel and Heiko Gruner

It is certified that error appears in the above-identified patent and that said Letters Patent is hereby corrected as shown below:

On title page:

Under Assignees:
"501 Glyco-Metall-Werke Daelen, Wiesbaden, Fed. Rep. of Germany; Loos GmbH, Zug, Switzerland" should read
--Glyco-Metall-Werke Daelen & Loos GmbH, Wiesbaden, Fed. Rep. of Germany; Plasmainvent AG, Zug, Switzerland--.

Signed and Sealed this

Twenty-sixth Day of March, 1991

*Attest:*

HARRY F. MANBECK, JR.

*Attesting Officer*  *Commissioner of Patents and Trademarks*